US009546802B2

(12) United States Patent
Ojala et al.

(10) Patent No.: US 9,546,802 B2
(45) Date of Patent: Jan. 17, 2017

(54) PIPE COLLECTOR FOR HEAT PUMP SYSTEMS

(75) Inventors: Mika Ojala, Boras (SE); Juha Ojala, Fristad (SE); Kari Ojala, Boras (SE); Heimo Ojala, Fristad (SE)

(73) Assignee: MUOVITECH AB, Bramhult (SE)

( * ) Notice: Subject to any disclaimer, the term of this patent is extended or adjusted under 35 U.S.C. 154(b) by 401 days.

(21) Appl. No.: 12/733,620

(22) PCT Filed: Sep. 17, 2008

(86) PCT No.: PCT/SE2008/051040
§ 371 (c)(1),
(2), (4) Date: Jun. 14, 2010

(87) PCT Pub. No.: WO2009/045153
PCT Pub. Date: Apr. 9, 2009

(65) Prior Publication Data
US 2010/0243209 A1 Sep. 30, 2010

(30) Foreign Application Priority Data
Oct. 5, 2007 (SE) ...................................... 0702240

(51) Int. Cl.
| F25B 27/00 | (2006.01) |
| F24J 3/08 | (2006.01) |
| F28F 1/40 | (2006.01) |
| F28F 13/12 | (2006.01) |

(52) U.S. Cl.
CPC ................. *F24J 3/083* (2013.01); *F28F 1/40* (2013.01); *F28F 13/12* (2013.01); *Y02E 10/125* (2013.01)

(58) Field of Classification Search
CPC ............... F24J 3/083; F28F 13/02; F28F 1/40; F28F 13/12; F28D 15/00; Y02E 10/125; F25B 27/00
USPC .............. 62/238.1, 315, 313, 343, 399, 285; 165/184, 45, 177, 179
See application file for complete search history.

(56) References Cited

U.S. PATENT DOCUMENTS

| 3,730,229 A * | 5/1973 | D'Onofrio .................... 138/114 |
| 4,058,982 A | 11/1977 | Wright |
| 4,317,268 A | 3/1982 | Bowden et al. |
| 4,325,228 A | 4/1982 | Wolf |

(Continued)

FOREIGN PATENT DOCUMENTS

| CN | 1415910 A | 5/2003 |
| DE | 39 39 714 | 6/1991 |

(Continued)

OTHER PUBLICATIONS

English language translation of JP 09229579 A, Takigawa et al., Sep. 1997.*

(Continued)

*Primary Examiner* — Len Tran
*Assistant Examiner* — Ana Vazquez
(74) *Attorney, Agent, or Firm* — Harness, Dickey & Pierce, PLC

(57) ABSTRACT

A collector for a heat pump installation includes a pipe to circulate a heat transfer liquid between a heat source and a heat pump. An inner surface of the pipe has an uneven surface structure that includes at least one of indentations or elevations extending helically in a longitudinal direction. The indentations or elevations are arranged to create a turbulent flow of the heat transfer liquid in the pipe.

17 Claims, 3 Drawing Sheets

(56) References Cited

U.S. PATENT DOCUMENTS

| | | |
|---|---|---|
| 4,383,419 A | 5/1983 | Bottum |
| 4,392,531 A | 7/1983 | Ippolito |
| 4,419,802 A | 12/1983 | Riese |
| 4,574,875 A | 3/1986 | Rawlings et al. |
| 4,688,717 A | 8/1987 | Jungwirth |
| 4,741,388 A | 5/1988 | Kuroiwa |
| 4,753,285 A * | 6/1988 | Rawlings .............. F24D 19/083 165/104.32 |
| 4,867,229 A | 9/1989 | Mogensen |
| 4,993,483 A | 2/1991 | Harris |
| 4,995,450 A * | 2/1991 | Geppelt et al. .......... 165/104.21 |
| 5,025,634 A | 6/1991 | Dressler |
| 5,224,347 A | 7/1993 | Yakabe |
| 5,224,357 A | 7/1993 | Galiyano |
| 5,655,599 A * | 8/1997 | Kasprzyk .................. F28F 1/40 165/133 |
| 5,791,405 A * | 8/1998 | Takiura et al. ............... 165/184 |
| 5,816,314 A | 10/1998 | Wiggs et al. |
| 6,000,459 A * | 12/1999 | Jeppesen ............. E21B 17/1035 165/45 |
| 6,138,744 A | 10/2000 | Coffee |
| 7,044,210 B2 * | 5/2006 | Usui ............................. 165/177 |
| 7,234,314 B1 * | 6/2007 | Wiggs ........................ F24J 2/04 165/45 |
| 7,856,839 B2 * | 12/2010 | Wiggs ............................. 62/260 |
| 2007/0023163 A1 | 2/2007 | Kidwell |
| 2007/0089868 A1 | 4/2007 | Houfuku et al. |
| 2008/0075559 A1 | 3/2008 | Baba |
| 2011/0259547 A1 * | 10/2011 | Kidwell et al. ................. 165/45 |

FOREIGN PATENT DOCUMENTS

| | | |
|---|---|---|
| DE | 20 2004 007 567 | 11/2004 |
| DE | 202004007567 | 11/2004 |
| DE | 10 2005 020 887 | 8/2006 |
| DE | 20 2007 008 907 | 10/2007 |
| EP | 1900989 | 3/2008 |
| FR | 2 273 217 | 12/1975 |
| JP | 7-305918 | 11/1995 |
| JP | 09229579 A * | 9/1997 |
| JP | 10-211537 | 8/1998 |
| JP | 10211537 A * | 8/1998 |
| JP | 2006-200848 | 8/2006 |
| WO | WO 92/19900 | 11/1992 |
| WO | WO 2009/145153 | 4/2009 |

OTHER PUBLICATIONS

English translation of Office Action dated Jun. 1, 2012 issued on corresponding Chinese Application No. 200880110370.3.
Supplementary European Search Report dated Jan. 11, 2011 issued in corresponding European Application No. 0883675.1.
Chinese Office Action dated Oct. 10, 2016 issued in corresponding Chinese Application No. 201410100880.X.

* cited by examiner

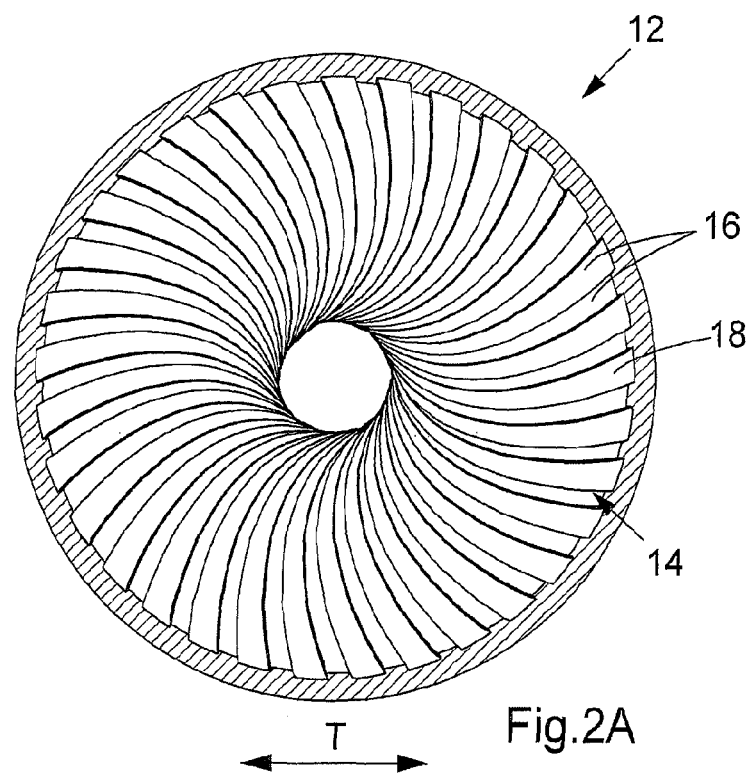
Fig.2A
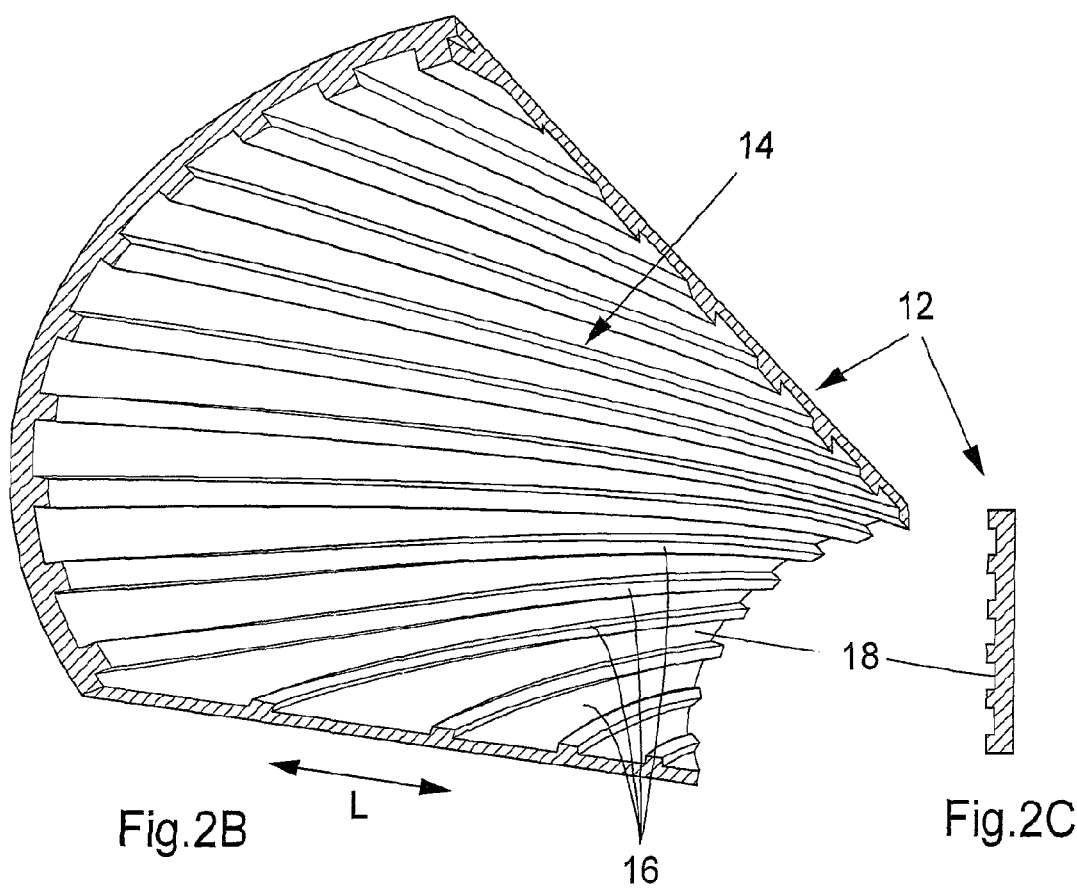
Fig.2B
Fig.2C

PIPE COLLECTOR FOR HEAT PUMP SYSTEMS

TECHNICAL FIELD

The present invention relates to a single pipe collector for a heat pump installation. The present invention also relates to heat pump system comprising the single pipe collector.

BACKGROUND

In water, ground and down in the bedrock, there are a heat source free of cost. Use of heat from sea, surface ground heat and bedrock heat is a secure, safe and environmental heating technique. The heat energy can be transmitted to an existing, conventional waterborne heating system and also used for hot-water production.

In a geothermal heating system, the hear is extracted from a bore hole, a so called drilled energy well. The collector is the pipe, which comprises a heat transfer medium in the form of a so called heat transfer liquid, that convey heat through the heated heat transfer medium and that also convey the cooled heat transfer medium back in a closed cycle.

In a surface ground heat plant, a several hundred meter long tubing is buried to a frostproof depth and arranged in coils. The collector tubing collects the heat that occur in the ground and use it to vaporize the cooling agent of the heat pump.

Sea heat works fundamentally in the same way as surface ground heat. The energy that exists stored in the sea water and in bottom layer is utilized. The collector tubing is put on the bottom of a water course.

There are various kinds of heat pump collectors. The kind of collector, that is the most frequent today, is called U-pipe collector. According to that principle, a separate, closed pipe is arranged in a drilled hole. This is for example carried out such that a continuous elongated pipe of plastics, suitably polyethylene, is bent on the middle such that it forms a U-shape. The lowest part of the "U" of the pipe is arranged on the drilled hole, and subsequently the pipe is advanced down into the drilled hole. Thus, the U-pipe forms a single continuous line for the heat transfer liquid in a closed cycle, in direction from the heat pump down into to drilled hole and back out of the drilled hole and further back to the heat pump in the one and the same pipe.

For installations of geothermal heating there are also a so called three-pipe collector, which is a variant of a collector that comprises a pipe for conveyance of the heat transfer liquid down into the drilled hole, which pipe has a branching-off to two pipes that transports the heat transfer liquid back from the drilled hole and further to heat pump. The term "single pipe collector" in this disclosure is a common term for the coils of collectors and collector tubing mentioned above that are intended for sea heat and surface ground heat. In the single pipe collector, the heat transfer liquid can be lead in a pipe with essentially the same cross-sectional area along the whole longitudinal extension of the collector.

Another type of collector according to the prior art is the so called coaxial collector. An inner pipe is arranged in an outer pipe. The pipes are welded together to one unit that subsequently is installed in a drilled hole. The purpose with this technique, having "a pipe in a pipe" is that it is desirable to avoid mixing for too long time of the cooled heat transfer liquid, that is brought down into the bore hole, with the heated heat transfer liquid, that shall be carried up in the collector. By providing an outer pipe with large diameter, a slower flow in the outer pipe having large diameter is achieved, whereby a positive output is reached when it comes to heat absorption quality. The coaxial collector is not found in any considerable extent on the market today, since this technique involves large installation and production costs. However, the coaxial collector is generally considered to be more effective than the conventional single pipe collector.

DE 20 2004 007 567 U1 discloses a coaxial collector according to the well known kind, described above. This comprises a connecting pipe for inflow of heat transfer liquid to an outer pipe, that comprises an uneven surface structure on the inside of the outer pipe. The heated heat transfer liquid is returned via an inner pipe up through a connecting pipe.

US 2007/0023163 A1 discloses a coaxial collector according to the well known kind as described above. This comprises a connecting pipe for inflow of heat transfer liquid in an inner pipe, that ends just above the bottom of an outer pipe, arranged outside the inner pipe. The heat transfer liquid is heated during circulation in the space between the outer pipe and the inner pipe, while guided via a helical structure ("turbulence generator" or turbulence generating structure") arranged on the outside of the inner pipe and further conveyed to a heat exchanger via a pump.

The wall thickness on the collector pipe is optimized such that the heat transfer medium obtain a maximal absorption of heat, the pipes becomes easy to handle and such that the return weight strive straight down into the bore hole, in the case with a drilled energy well. The length is adapted as desired.

However, a problem with the traditional single pipe collector is that the absorption of energy from the surrounding water in the energy well is not optimal. There is a large need for a more effective utilization of the energy. This also applies to the single pipe collectors that are intended for sea systems and surface ground heat plants.

DESCRIPTION OF THE INVENTION

It is an object with the present invention to at least partially eliminate those drawbacks that are associated with apparatuses according to the state of the art. Further, one object is to achieve an improved absorption of energy for the heat transfer medium in a single pipe collector from the surrounding ground in a surface ground heat plant, or from the surrounding water in an energy well for a geothermal heating system or in a sea heating system.

This object has been reached with a single pipe collector for a heat pump installation according to the present invention. The collector comprises a pipe intended for installation in a heat pump system, in which pipe a heat transfer liquid circulates in a closed cycle for conveyance of heat that is absorbed from a heat source to a heat pump and return of the heat transfer liquid back to the heat source. The inward surface of the pipe has an uneven surface structure that comprises indentations and/or elevations.

By the single pipe collector, and a heat pump plant comprising the single pipe collector, according to the present invention, an improved absorption of energy is accomplished since the uneven surface structure creates a turbulent flow, in comparison to collectors according to the prior art for sea heat, surface ground heat plant or energy wells, which have a smooth inward surface that provides a laminar flow of the heat transfer medium through the collector.

By the term "pipe" in this description, is also meant hose, conduit, or the like.

According to one embodiment, the surface structure on the inward surface is a grooved pattern, whereby the surface is designed with indentations that suitably forms continuous recesses in the surface that extends essentially in the longitudinal direction of the pipe. The recesses may be evenly spread around the inner circumferential surface of the pipe, as seen in a cross-section of the pipe.

According to another embodiment, the indentations and/or elevations extends helically in the longitudinal direction of the pipe. The direction of the helical shape can be altered at least at some portion in the longitudinal direction of the pipe, suitably at least every two meters, preferably each meter, in the longitudinal direction of the pipe.

Additional preferred features, advantages and favourable embodiments of the invention, are evident from the dependent claims, and also in the following from description of the embodiments.

DESCRIPTION OF THE DRAWINGS

The present invention will now be described more in detail by examples of application, by reference to the accompanying drawings, without limiting the interpretation of the invention thereto, where FIG. 2A shows, in a cross-section of a single pipe collector, helically indentations and/or elevations on the inward surface of the collector pipe, according to an embodiment of the present invention, FIG. 2B shows, in a longitudinal, perspective cross-section, a part of the collector shown in FIG. 2A, FIG. 2C schematically shows a stretched out pipe wall in a cross-section of the collector shown in FIGS. 2A-B.

DETAILED DESCRIPTION OF EMBODIMENTS

Figure 1:
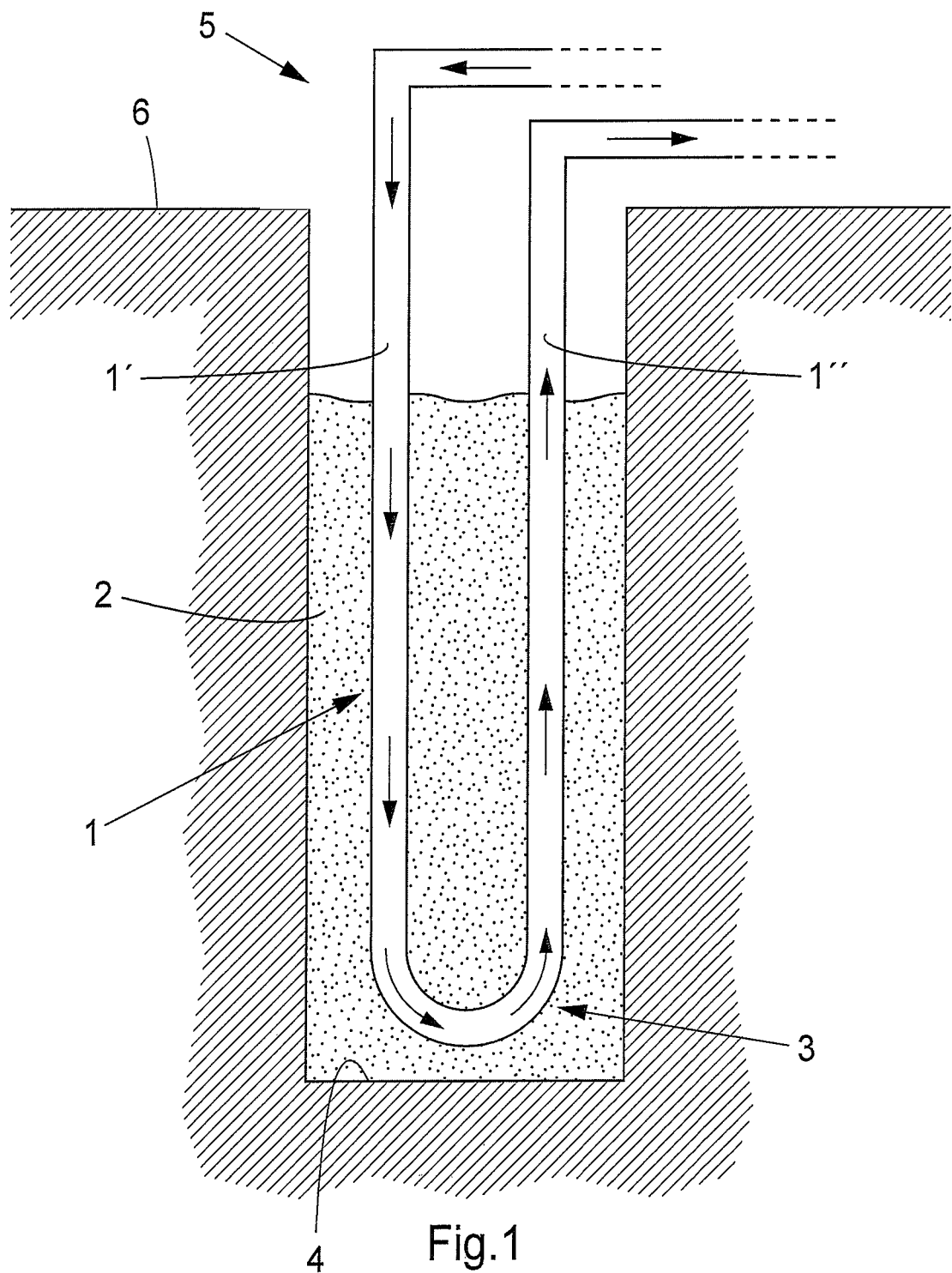
FIG. 1 shows the principle for a single pipe collector in the shape of a conventional U-pipe collector.

FIG. 1 shows the principle for a conventional U-pipe collector. According to this principle, a continuous, sealed pipe 1 is arranged in a drilled hole 2. This is for instance carried out in such a way that a plurality of single pipes are assembled together to a continuous longitudinal pipe 1 of plastics, suitably polyethylene. Since the continuous pipe 1 forms a U-shaped curve 3 in the end towards the bottom 4 of the bore hole 2, where the pipe 1' for the heat transfer liquid that is conveyed down (see arrows in the figure) in the bore hole is connected to the pipe 1" for heat transfer liquid that is conveyed up (see arrows) and out of the bore hole, the system is called "U-pipe collector". In other words, the continuous pipe 1 is bent in the middle such at it forms a U-shape. FIG. 1 only shows the principle. In reality, an above mentioned U-pipe collector system is all welded in order to fulfil the requirements for safety of operation. Hence, the return bend, that is the U-shaped lower portion or the curve 3, is therefore assembled in factory for operational security reasons. The upper part 5 of the collector system is usually terminated in a manhole at ground level 6, from where the collector pipes 1, 1', 1" are connected to a heat pump (not shown). During assembly of the collector system, the return bend 3 of the collector system is positioned above the bore hole 2, whereupon advance downwards is carried out in the bore hole. Accordingly, the U-pipe forms a single, continuous conduit for the heat transfer liquid in a circuit, in direction from the heat pump down in the bore hole and back up and out of the bore hole and further back to the heat pump in the one and the same pipe.

A part of the single pipe collector for a geothermal heating system, according to an embodiment of the present invention, is shown in FIG. 2A in a cross-section T and in FIG. 2B in a longitudinal cross-section L. The collector comprises a pipe 12, suitably manufactured of polyethylene, intended for assembly in a drilled energy well, in which pipe a heat transfer liquid circulates in a closed cycle for conveyance of geothermal heat to a heat pump and return of the heat transfer liquid back to the energy well. The inward surface 14 of the pipe 12 has an uneven surface structure that comprises indentations and/or elevations 16. Although that a single pipe collector in the shape of a U-pipe collector is described with reference to the figures, such a single pipe collector is also applicable for sea heat systems and surface ground heat plants as well as three way collectors, within the scope of the present invention.

According to a preferred embodiment, the single pipe collector according to the present invention is a continuous pipe 12 with a cross-sectional area that is essentially similar along the whole longitudinal direction L of the pipe.

According to a preferred embodiment, the surface structure on the inward surface 14 of the single pipe collector is a grooved pattern, whereby the inward surface is designed with indentations 18 that suitably forms continuous grooves in the surface that extends essentially in the longitudinal direction L of the pipe. The grooves are evenly spread around the inner circumferential surface of the pipe, as seen in a cross-section T of the pipe. FIG. 2C shows in a cross-section a stretched out pipe wall of the collector pipe 12 where indentations in the shape of the grooves 18 are evident.

Figure 3:
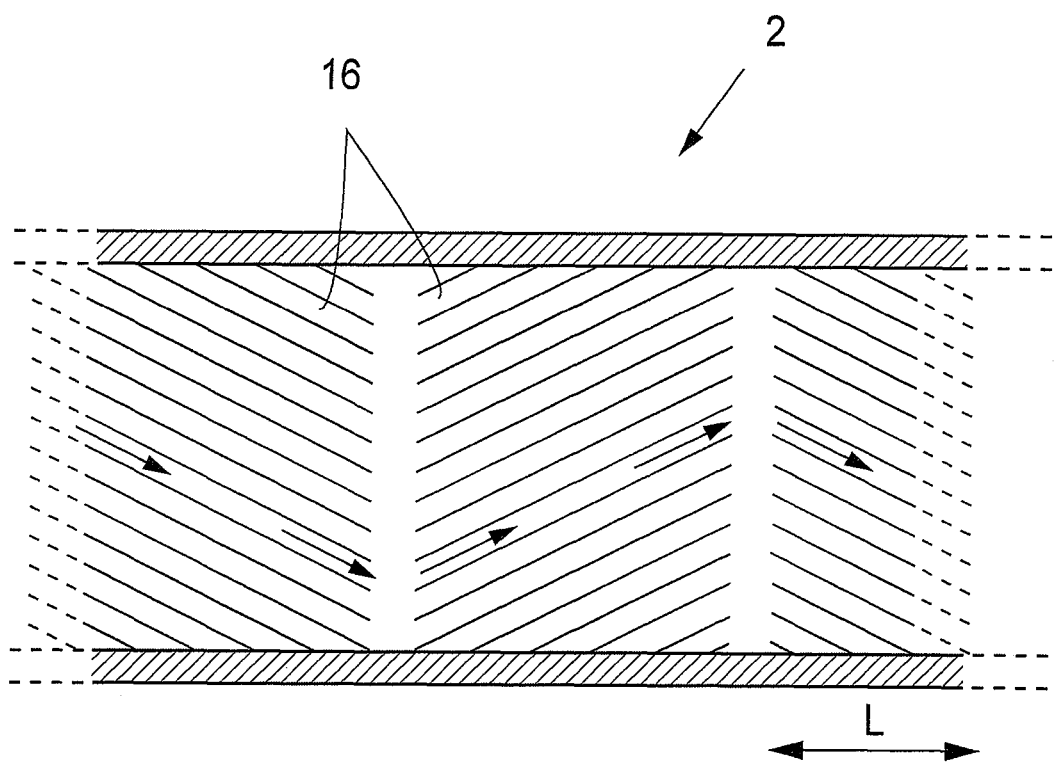
FIG. 3 shows, in a longitudinal cross-section, a part of a collector, according to an embodiment of the present invention.

FIG. 3 shows a part of a single pipe collector according to an embodiment of the present invention. The indentations and/or elevations 16 are extending helically in the longitudinal direction L of the pipe. The direction of the helical shape (see arrows in FIG. 3) can be altered at least at some portion in the longitudinal direction L of the pipe. The direction of the helical shape can be altered suitably at least every second meter, preferably every meter, in the longitudinal direction L of the pipe.

According to the present invention, the grooves or the pattern, such as a surface structure of indentations and/or elevations, may be continuous or discontinuous in the longitudinal direction of the single pipe collector. As shown in the embodiment in FIG. 3, a flat portion on the inward surface of the pipe can be arranged as a temporary, but short transition between two helically portions.

Usual dimensions for the collector pipes 12 according to the invention are within the range 25-63 mm in diameter. The height of the indentations and/or elevations 16, alternatively the grooves 18 or the grooving, can be varied, but can typically be within the range of 0.2-5 mm depending on the size of the pipes and the wall thickness, preferably 0.2-2 mm, for the most usual dimensions of the collector pipes 12.

EXAMPLE

Experiments were carried out in a heat pump system, with two heat pumps of 16 kW and 32 kW, respectively, for supply of hot water and heating in a building with 19 apartments each with an area of 40 m². Four of the water filled bore holes, with a diameter of 140 mm and a depth of 260 mm, that constitutes the heat source of the system, were used in the experiment. Ethanol in a concentration of 20 percentage by volume in an aqueous solution, with a freezing point of −8° C. In the experiment, each of the four boreholes was equipped with four different types of single pipe collectors, respectively. The respective borehole design, dimension and arrangement are tabulated in. Table 1 below.

TABLE I

| No. | Active length of borehole | Horizontal deviation at 260 m fr. initial position | Type of kollektor Dimension in mm | |
|---|---|---|---|---|
| 2 | 251.6 m | 84.9 m | PE40x3.7 | 3-pipe |
| 4 | 254.5 m | 64.1 m | PE40x2.4 | U-pipe |
| 5 | 242.7 m | 75.7 m | PE40x2.4 | U-pipe with spacers |
| 6 | 245.7 m | 96.9 m | PE40x2.4 | U-pipe with helical grooves on inner surface |

The mean undisturbed ground temperature was measured to 8.7° C., and the average ground thermal conductivity 3.75 W/m K. It should also be explained that single pipe collector no. 2 (BH2) in the Table, that is the three-pipe collector, is a variant of collector that comprises one pipe for conveyance of the heat transfer liquid down into the bore hole and two pipes that guides the heat transfer liquid back out of the bore hole and further to a heat pump. The single pipe collector no. 4 (BH4) is a conventional U-pipe collector. The single pipe collector no. 5 (BH5) is a conventional U-pipe collector provided with spacers, that are intended to keep the pipes apart in the bore hole such that they not will be in contact with each other. The single pipe collector no. 6 (BH6) is a U-pipe collector according to the present invention, that comprises indentations and/or elevations on the inward surface of the pipe in a helical extension along the longitudinal extension of the pipe. The helical shape is altered periodically along the longitudinal extension of the pipe.

The flows in the respective collectors were checked. Each borehole heat exchanger was instrumented with thermocouples for temperature measurements at the bottom and outlet points, on the heat transfer liquid inwards of the collector. The total pressure drop in the collectors is also measured during the tests at the collector inlet and outlet lines using a pressure gauge. Temperatures have been measured at different flow conditions in the bore holes and when the conditions have stabilized after the heat pump start up. During a measuring period the fluid density, kinematic viscosity and heat capacity were calculated at the measured temperature. Hence, the Reynolds number, the friction factor and the pressure drop were calculated. Finally, the heat absorbed per meter by the heat transfer fluid was calculated for each collector, which was used in order to calculate the borehole thermal resistance for each of the collector as well. The temperature value for the borehole wall was measured by the aid of a fibre optical cable and was assumed to be constant and equal to 7.2° C. for the calculations in this experiment.

With respect to heat extraction (kW), the best heat extraction performance is obtained in BH6 and the worst performance is in BH2. Nevertheless, it is not recommended to compare the collectors by looking at the extracted heat due to the fact that not all the measurements were taken at the same time, which could cause different inlet and groundwater temperatures at different measurement occasions. With respect to the thermal resistance, it was observed that BH6 had the lowest values of all the collectors (e.g. at an up flow of 1.8 m$^3$/h, BH6 had about 0.16 K/(W/m) while BH2 had about 0.18, BH4 had about 0.23 and BH5 had about 0.22), with the exception for one measured value where BH5 were best. Hence, this means for one aspect that the single pipe collector according to the invention shows the best performance. The result for the pressure drop is evident from Table II below.

TABLE II

| | Pressure drop [KPa] for different flows [m$^3$/h]: | | | | | |
|---|---|---|---|---|---|---|
| | 1.5 | | 1.8 | | 2.5 | |
| No | experimental | estimat. | experimental | estimat. | experimental | estimat. |
| 2 | 54.21 | 48.35 | 75.00 | 75.59 | 144.53 | 129.73 |
| 4 | 61.43 | 56.41 | 87.33 | 78.22 | 149.60 | 129.54 |
| 5 | 56.54 | 56.68 | 81.10 | 77.98 | 149.63 | 128.36 |
| 6 | 49.10 | 58.02 | 70.03 | 77.31 | 131.51 | 136.20 |

To sum up, the results implies that the pipe dimensions have an important influence, the spacers (collector in BH5) contributes probably not to increased heat transmission and that a surface structure on the inside of the pipes improves the performance of the collectors. With the exception of BH6, it is generally observed that the calculated pressure drop is slightly lower than the experimental values. This is attributed to the fact that the accessories such as elbows, bends, bottom part of the collector, are not considered in the calculation. It is observed that the calculated values for BH6 are higher than the experimental ones, which unexpectedly shows that the real pressure drop in the single pipe collector with surface structure on its inward surface, in the shape of indentations and/or elevations according to the present invention, is in fact lower. BH6 has the lowest pressure drop of all the collectors of the BHEs, including BH4 and BH5 which are common U-pipe collectors with the same dimensions. This is surprising. The pressure drop analysis indicates that BH6 is the best option, since the required pumping power for the heat transfer fluid would be slightly lower for this collector.

The invention claimed is:

1. A single pipe collector for a heat pump installation, comprising:
   a polymer pipe configured to circulate a heat transfer liquid between a geothermal heat source and a heat pump, the polymer pipe having a center axis that is exclusive to the polymer pipe relative to a center axis of another section of the polymer pipe, and wherein the polymer pipe includes,
   an inner surface that includes a plurality of separate polymer indentations or elevations extending continuously in a longitudinal direction of the polymer pipe, wherein,
      the polymer indentations or elevations are configured to induce turbulent flow in a heat transfer liquid flowing through the polymer pipe,
      each polymer indentation or elevation is spaced apart from adjacent indentations or elevations,
      the polymer indentations or elevations extend helically in continuously alternating rotational directions in the longitudinal direction of the polymer pipe, such that the polymer indentations or elevations continuously alternate between extending helically in a common first rotational direction and extending helically in a common second rotational direction, the second rotational direction is opposite to the first rotational direction, the polymer indentations or elevations continuously alternate between the common first rotational direction and the common second rotational direction at a common interval in the longitudinal direction, and the common interval is greater than 1 meter and less than 2 meters.

2. The single pipe collector according to claim 1, wherein the indentations or elevations are spaced apart substantially uniformly in the inner surface of the polymer pipe.

3. The single pipe collector according to claim 1, wherein the polymer pipe has a substantially uniform cross-sectional area.

4. A heat pump system comprising the single pipe collector according to claim 1.

5. The single pipe collector according to claim 1, wherein, at least a portion of the polymer pipe has a U-shape, such that the polymer pipe includes a bent portion of the polymer pipe between straight polymer pipe portions.

6. The single pipe collector according to claim 1, wherein, the polymer indentations or elevations continuously alternate between extending helically according to a first angle and extending helically according to indentations or elevations in the second pattern are oriented at a second angle.

7. The single pipe collector according to claim 6, wherein the first and second angles are substantially equal relative to an axis that crosses the inner surface of the polymer pipe.

8. The single pipe collector according to claim 1, wherein the plurality of separate polymer indentations or elevations include structures selected from a group consisting of protrusions and grooves.

9. A collector comprising:

a polymer pipe in a non-coaxial configuration, the polymer pipe being configured to circulate a heat transfer liquid between a geothermal heat source and a heat pump, the polymer pipe including a first length and a second length coupled to the first length, and wherein the polymer pipe includes, an inner surface that includes a plurality of separate polymer indentations or elevations extending continuously in a longitudinal direction of the polymer pipe, wherein, the polymer indentations or elevations are configured to induce turbulent flow in a heat transfer liquid flowing through the polymer pipe, each polymer indentation or elevation is spaced apart from adjacent indentations or elevations, the polymer indentations or elevations extend helically in continuously alternating rotational directions in the longitudinal direction of the polymer pipe, such that the polymer indentations or elevations continuously alternate between extending helically in a common first rotational direction and extending helically in a common second rotational direction, the second rotational direction is opposite to the first rotational direction, the polymer indentations or elevations continuously alternate between the common first rotational direction and the common second rotational direction at a common interval in the longitudinal direction, and the common interval is greater than 1 meter and less than 2 meters.

10. The collector according to claim 9, wherein the indentations or elevations are spaced apart substantially uniformly in the inner surface of the polymer pipe.

11. The collector according to claim 9, wherein the polymer pipe has a substantially uniform cross-sectional area.

12. A heat pump system comprising the collector according to claim 9.

13. The collector according to claim 9, wherein, at least a portion of the polymer pipe has a U-shape, such that the polymer pipe includes a bent portion of the polymer pipe between straight polymer pipe portions.

14. The collector according to claim 9, wherein, the polymer indentations or elevations continuously alternate between extending helically according to a first angle and extending helically according to a second angle.

15. The collector according to claim 14, wherein the first and second angles are substantially equal relative to an axis that crosses the inner surface of the polymer pipe.

16. The collector according to claim 9, wherein the plurality of separate polymer indentations or elevations include structures selected from a group consisting of protrusions and grooves.

17. A single pipe collector for a heat pump installation, comprising:

a polymer pipe configured to circulate a heat transfer liquid between a geothermal heat source and a heat pump, wherein the polymer pipe includes, an inner surface that includes a plurality of separate polymer indentations or elevations extending continuously in a longitudinal direction of the polymer pipe, wherein, the polymer indentations or elevations are configured to induce turbulent flow in a heat transfer liquid flowing through the polymer pipe, each polymer indentation or elevation is spaced apart from adjacent indentations or elevations, the polymer indentations or elevations extend helically in continuously alternating rotational directions in the longitudinal direction of the polymer pipe, such that the polymer indentations or elevations continuously alternate between extending helically in a common first rotational direction and extending helically in a common second rotational direction, the second rotational direction is opposite to the first rotational direction, the polymer indentations or elevations continuously alternate between the common first rotational direction and the common second rotational direction at a common interval in the longitudinal direction, and the common interval is greater than 1 meter and less than 2 meters.

* * * * *